United States Patent
Singh

(10) Patent No.: US 6,351,824 B1
(45) Date of Patent: Feb. 26, 2002

(54) METHODS AND APPARATUSES FOR CONTROLLING THE OPERATION OF A DIGITAL PROCESSING SYSTEM

(75) Inventor: Amar Singh, Bothell, WA (US)

(73) Assignee: Sophisticated Circuits, Inc., Bothell, WA (US)

( * ) Notice: Subject to any disclaimer, the term of this patent is extended or adjusted under 35 U.S.C. 154(b) by 0 days.

(21) Appl. No.: 09/002,899

(22) Filed: Jan. 5, 1998

(51) Int. Cl.$^7$ ................................................. G06F 11/07
(52) U.S. Cl. .......................................... 714/23; 714/55
(58) Field of Search ............................ 714/23, 51, 55, 714/25, 48, 49, 53, 57; 709/224, 251; 370/248, 449, 450

(56) References Cited

U.S. PATENT DOCUMENTS

| | | | | |
|---|---|---|---|---|
| 4,627,060 A | * | 12/1986 | Huang et al. | 714/36 |
| 4,635,187 A | * | 1/1987 | Baron et al. | 709/100 |
| 4,747,100 A | * | 5/1988 | Roach et al. | 370/86 |
| 4,912,708 A | * | 3/1990 | Wendt | 714/55 |
| 5,347,167 A | | 9/1994 | Singh | 307/125 |
| 5,560,033 A | * | 9/1996 | Doherty et al. | 713/340 |
| 5,655,083 A | * | 8/1997 | Bagley | 713/23 |

* cited by examiner

Primary Examiner—Norman M. Wright
Assistant Examiner—Christopher A. Revak
(74) Attorney, Agent, or Firm—Blakely, Sokoloff, Taylor & Zafman

(57) ABSTRACT

A method and an apparatus for controlling the operation of a digital processing system. In one example of a method of the invention, a request is repeatedly generated for the digital processing system, and a response to the request is normally provided by the digital processing system when it is not in a default state (e.g. when not crashed). If the digital processing system is in a default state then no response is provided, and a control device automatically restarts the digital processing system. In another example of a method of the invention, a status indicator is, when the system is not in a fault state, repeatedly sent to a control device. This status indicator resets a counter in the control device, thereby preventing the counter from reaching a predetermined value. If the counter reaches the predetermined value, then the control device automatically restarts the digital processing system.

5 Claims, 4 Drawing Sheets

METHODS AND APPARATUSES FOR CONTROLLING THE OPERATION OF A DIGITAL PROCESSING SYSTEM

BACKGROUND OF THE INVENTION

The present invention relates to methods and apparatuses for controlling the operation of a digital processing system, and more particularly, to methods and apparatuses for automatically controlling the operation of the system in response to certain fault conditions.

Modern digital processing systems, such as computer systems, can often operate autonomously without any human user interaction or intervention. For example, modern web servers and other servers such as file servers can perform numerous operations without any intervention by a local operator for that computer system. It will be appreciated that client systems which log on to and use the server are user interactions with the server; however, these are not user interactions by the local operator of the computer system. Client systems which logon to a server make requests to the server through a communication interface, such as a network adapter or modem or other device. The local operator normally controls the computer system by using a keyboard or pointing device such as a mouse to control locally the computer system.

While modern digital processing systems can perform many operations without intervention by a local operator, it is often necessary to intervene in the operation of the computer to rectify a fault condition. When the operator is locally present, it is an easy operation for the operator to restart the computer system or otherwise deal with the fault condition. However, when the operator is remotely located relative to the computer system, this intervention by a user typically requires traveling to the site where the computer system is operating. This travel is at least an inconvenience. One prior approach for solving this problem is described in U.S. Pat. No. 5,347,167 by Amar Singh of Sophisticated Circuits, Inc. of Bothell, Wash. This patent describes a technique for remotely restarting a computer system once it has been determined by a human user that the computer system is crashed or otherwise needs to be restarted. The remotely located human user makes a telephone call to a control device co-located with the computer system which needs to be restarted, and through this telephone call, a control device causes the entire computer system to be restarted.

While this approach alleviates traveling to the computer system which has failed, it still requires that a human user detect the failed computer system by remotely monitoring the operation of the computer system.

Thus, it is desirable to provide an improved method for controlling the operation of a computer system.

SUMMARY OF THE INVENTION

The present invention describes methods and apparatuses for controlling the operation of a digital processing system. In one example of a method of the invention, a request is repeatedly generated for the digital processing system, and a response to the request is normally provided by the digital processing system when it is not in a fault state (e.g. when not crashed). If the digital processing system is in a fault state then no response is provided, and a control device automatically restarts the digital processing system.

In another example of a method of the invention, a first software program, which is being executed on a digital processing system, provides a first status indicator to a control device which is coupled to the digital processing system. Typically, the status indicator is periodically and repeatedly provided to the control device when the digital processing system is not in a fault state. When the status indicator is not provided to the control device, a timer in the control device causes the control device to restart the digital processing system. The status indicator, when received by the control device, normally resets the timer so that the digital processing system is not restarted. The first software program may receive a second status indicator from a second software program (which may be considered to be a server application in certain examples); receipt of this second status indicator indicates that the second software program is not in a fault state. If the second status indicator is not received within a period of time, the first software program has a timer which expires after the period of time, and the first software program may specify a fault condition to the control device (e.g. by not resetting a timer in the control device). The specification of the fault condition will typically cause the control device to restart the digital processing system or to cause some other actions which have been selected by a user to respond to the fault condition.

BRIEF DESCRIPTION OF THE DRAWINGS

The present invention is illustrated by way of example and not limitation in the figures of the accompanying drawings, in which like references indicate similar elements.

DETAILED DESCRIPTION

The subject invention will be described with reference to numerous details set forth below, and the accompanying drawings which illustrate the invention. The following description and drawings are illustrative of the invention and are not to be construed as limiting the invention. Numerous specific details are described to provide a through understanding of the present invention. However, in certain instances, well known or conventional details are not described in order to not unnecessarily obscure the present invention in detail.

Figure 1:
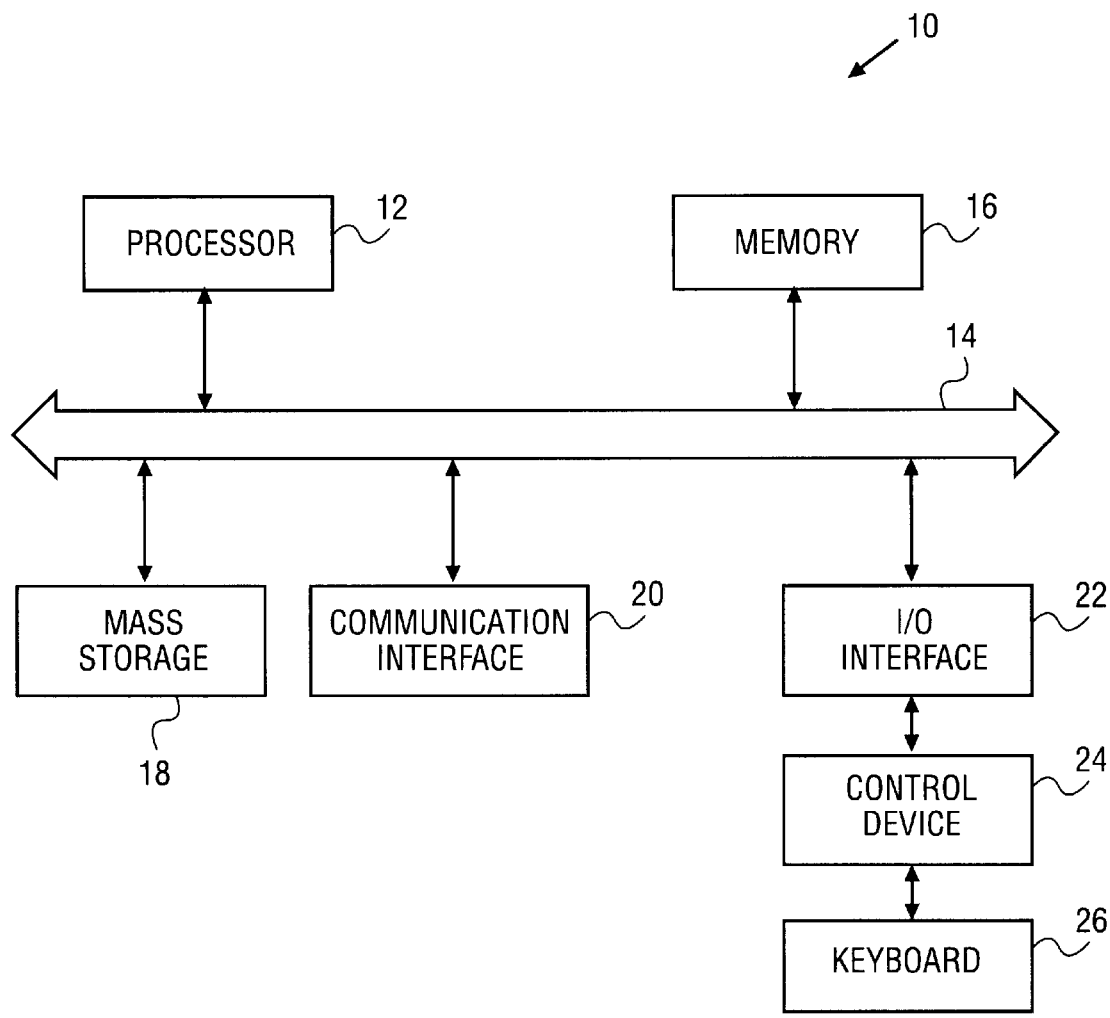
FIG. 1 illustrates an example of a digital processing system which may be used with the present invention.

FIG. 1 shows one example of a conventional computer system which may be used as a server computer system or as a stand alone computer system. It will be appreciated that the computer system is one form of a digital processing system. It will also be appreciated that the computer system 10 shown in FIG. 1 is one example of many possible computer systems which have different architectures. The computer system 10 includes a processor 12 which may be a conventional microprocessor, such as the Motorola PowerPC microprocessor or an Intel Pentium microprocessor. Memory 16 is coupled to the processor 12 by the bus 14, which may be considered to be a system bus. Memory 16 may be dynamic random access memory (DRAM) and may also include static RAM (SRAM). The bus 14 couples the processor 12 to the memory 16 and also to mass storage 18 and to the I/O (input/output) interface 22. The I/O interface 22 is shown in simplified form here to indicate the various controllers and interfaces used for the various peripheral devices, such as displays, printers, scanners, etc. It will be appreciated that a display device, such as a CRT or a liquid crystal display device is often coupled to the computer system 10 through an I/O interface, such as the interface 22. Other input and output devices may include disk drives, a digital camera, and a mouse or other pointing device. The mass memory 18 is often a magnetic hard disk, an optical disk, or another form of storage for large amounts of data. Some of this data is often written, by a direct memory access process, into memory 16 during execution of software in the system 10. The communication interface 20 allows the system 10 to interface to external systems. This interface 20 may be an analog modem, an ISDN modem, a cable modem, a Token Ring interface, a satellite transmission interface (e.g. "Direct PC"), or other interfaces for coupling a digital processing system to other digital processing systems.

It will be appreciated that system 10 of FIG. 1 represents any of a number of different possible digital processing systems. For example, a network computer may also be considered to be a computer system or a digital processing system which may be used with the present invention. Network computers may not include a hard disk or other mass storage, and the executable programs are loaded from a network connection into the memory 16 for execution by the processor 12. A WebTV system, which is known in the art, may be considered to be a computer system according to the present invention, but it may not include certain features shown in FIG. 1. A cellular phone having a suitable display and a processor and memory may also be considered to be a digital processing system or a computer system which may be used with the present invention. A typical computer system will usually include at least a processor, memory, and a bus coupling the memory to the processor. It will also be appreciated that the system 10 is typically controlled by an operating system software.

The computer system 10 of FIG. 1 includes a control device 24 which is coupled to the I/O interface 22 and is also coupled to the keyboard 26. This control device may be used in certain embodiments of the present invention in order to cause certain actions to occur as a result of monitoring the status of one or more software programs which are executing on the processor 12. In one particular embodiment the control device 24 is coupled to the Apple Desktop Bus (ADB) which is found on the Macintosh line of computer systems from Apple Computer, Inc. of Cupertino, Calif. The control device is plugged into the ADB port of the computer system and the computer's keyboard is plugged into the control device 24. The system 10 typically receives its power supply through the control of control device 24; that is, the control device 24 controls the supply of power to the system 10.

Figure 2:
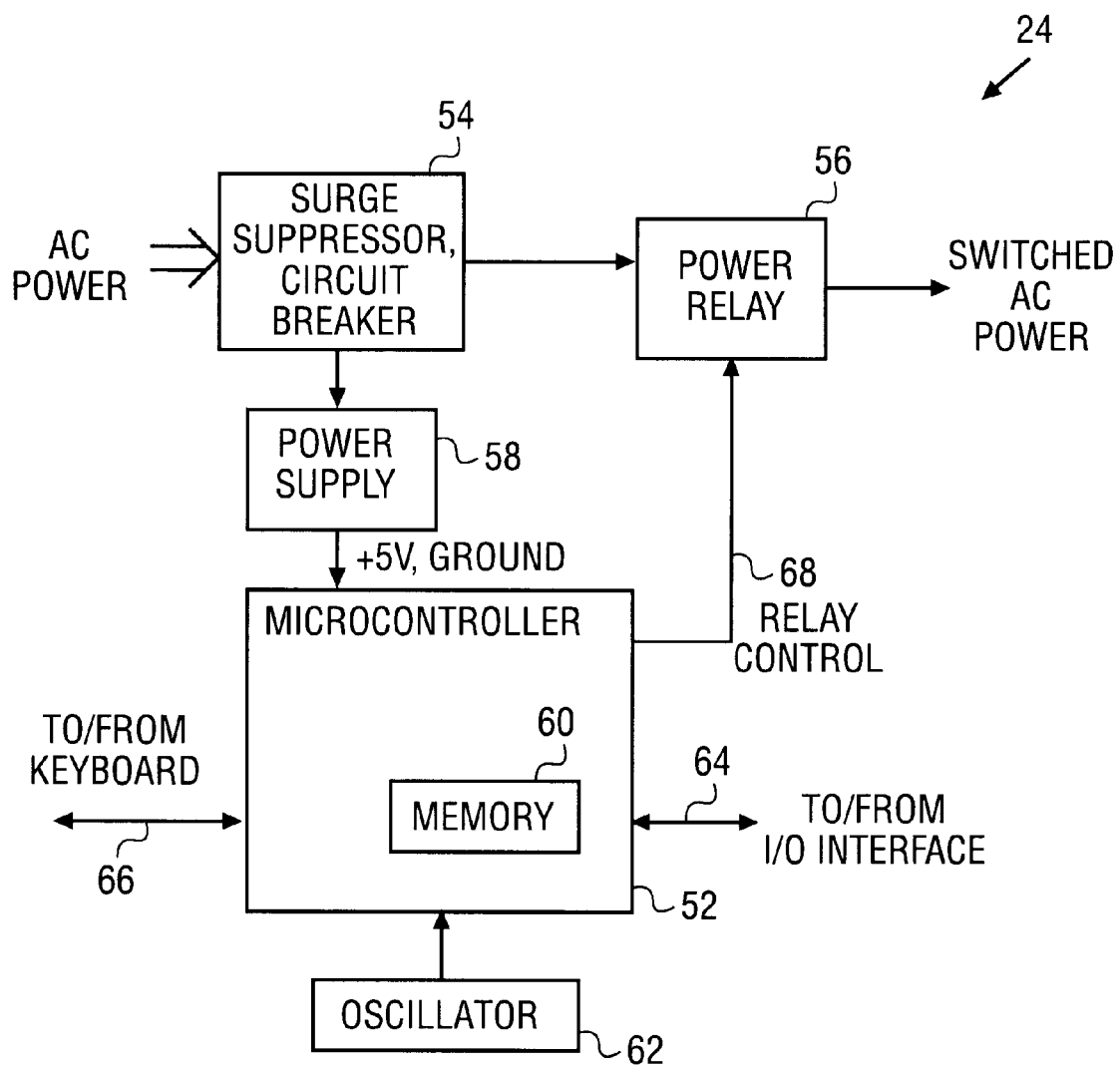
FIG. 2 illustrates a particular implementation of a control device which may be used with the present invention.

FIG. 2 shows an example of a control device 24. It will be appreciated that alternative implementations of this control device may be used depending upon the architecture of the particular computer which is coupled to and operates with the control device. The control device 24 in this particular example, includes a surge suppressor and circuit breaker 54 which is coupled to provide power from a power source, such as AC power, to a power supply 58 and to a power relay 56. The power supply 58 provides rectified DC power from the power source, such as AC power, to the microcontroller 52. The power relay 56 provides a switched AC power supply (or other switched power supply) to other components, such as the system 10, under the control of the relay control signal 68 provided from the microcontroller 52. Thus, the microcontroller 52 may control the supply of power to the system 10. The microcontroller 52 is coupled to the keyboard through the connection 66 and is coupled to the I/O interface through the connection 64. An oscillator 62 provides a timing signal to the microcontroller 52. The microcontroller 52 includes memory 60 which is used to store software and information which may be used to practice the methods of the present invention as described herein. Alternatively, the microcontroller 52 may access externally located memory such as flash memory which is also powered by the power supply 58. In the particular example provided here, the control device is coupled to an I/O interface and a keyboard. However, the control device may be coupled to other I/O interfaces, such as a conventional serial port (e.g. RS-232, Universal Serial Bus, etc.), or a network connection (e.g. Ethernet, Token Ring, etc.), and the control device does not need to be coupled to a keyboard as described herein.

The control device 24 functions in combination with, in accordance with one embodiment of the present invention, software operating on the digital processing system to which the control device 24 is coupled. The control device 24 can turn the power to the computer system on or off when the computer system 10 receives its AC power supply from the power relay 56. Also, the control device 24 can send command signals to the computer system 10 through the I/O interface 22 through the connection 64. In this manner, the control device 24 may restart the entire computer system or may relaunch a particular application or may provide other instructions or operations as determined by a user. This will be described in more detail below.

Figure 3:
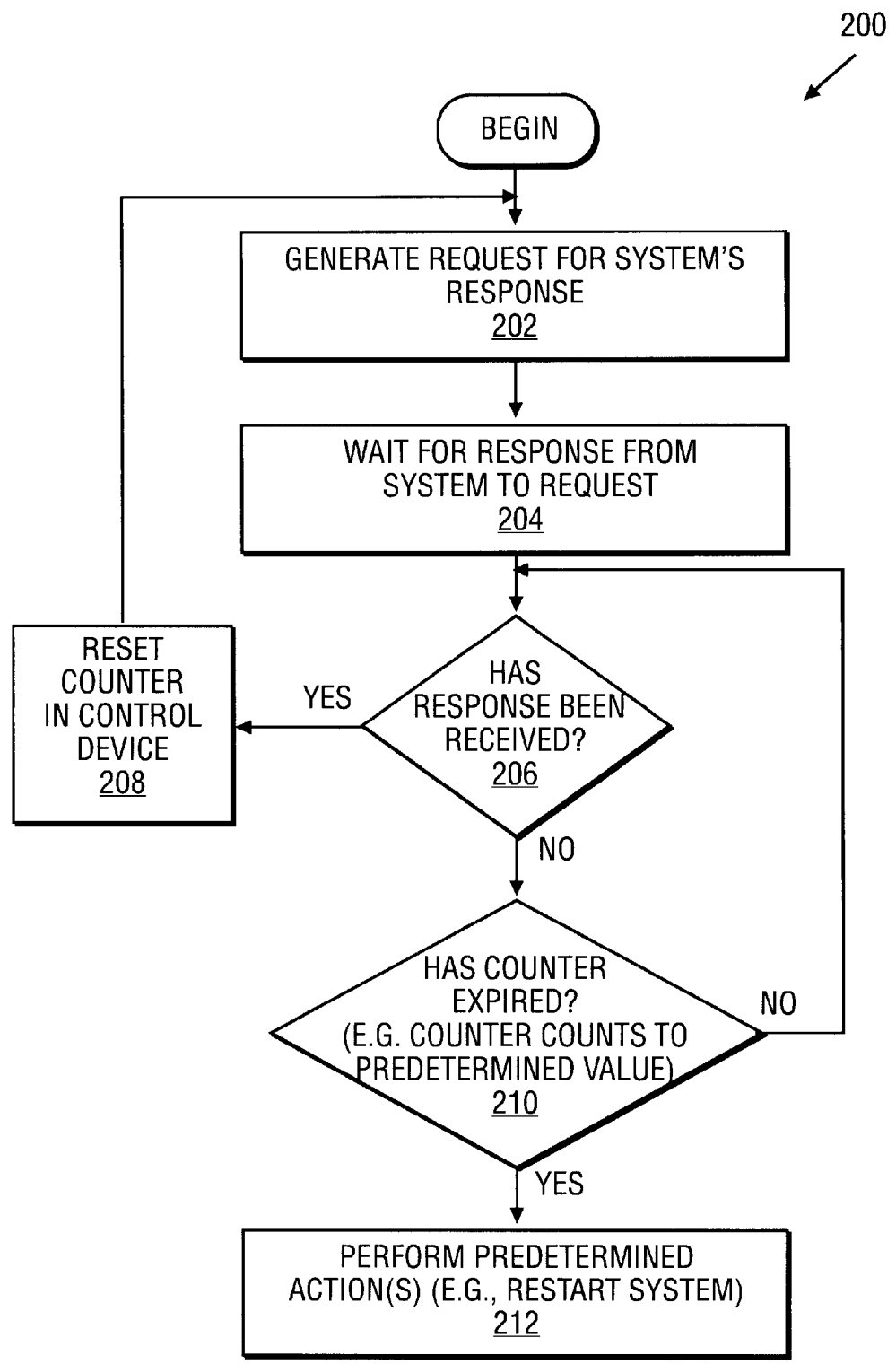
FIG. 3 shows a flowchart for a method of monitoring and responding to the status of a digital processing system in accordance with one aspect of the present invention.

FIG. 3 shows an example of a method for monitoring for a complete failure such as a system crash. This method typically involves a master hardware based timer. This timer may be placed in the control device 24 and be continuously powered by the power supply 58. The method 200 of FIG. 3 begins in step 202 in which a request for the system's response is generated. This request would typically be created by monitoring software and directed to the processor 12. In step 204 a response to the request is awaited and in step 206 it is determined whether or not a response has been received. Typically, the processor will respond to the software request, causing the monitoring software to signal that a response has occurred to the control device 24. This causes, in step 208, the counter in the control device to be reset and processing returns back to step 202 as shown in FIG. 3. If no response has been received as determined in step 206 then processing proceeds to step 210 in which it is determined whether the counter has expired. This counter may be maintained and controlled in the control device such that the determination of whether the counter has expired is performed by the microcontroller 52 which also controls the counting of the counter and the resetting of the counter. Once the counter has counted to a predetermined value, which may be specified by a user, the microcontroller in step 212 will perform the desired predetermined actions, such as restarting the entire system. This may be performed by the microcontroller sending the proper restart codes (e.g. the signals caused by pressing a particular group of keys on the keyboard) to the I/O interface which will then cause the entire computer system to be rebooted or otherwise restarted. The microcontroller 52 may also temporarily turn off the power supply to the digital processing system by controlling the relay control line 68 and then turn power back on to restart the system.

Figure 4:
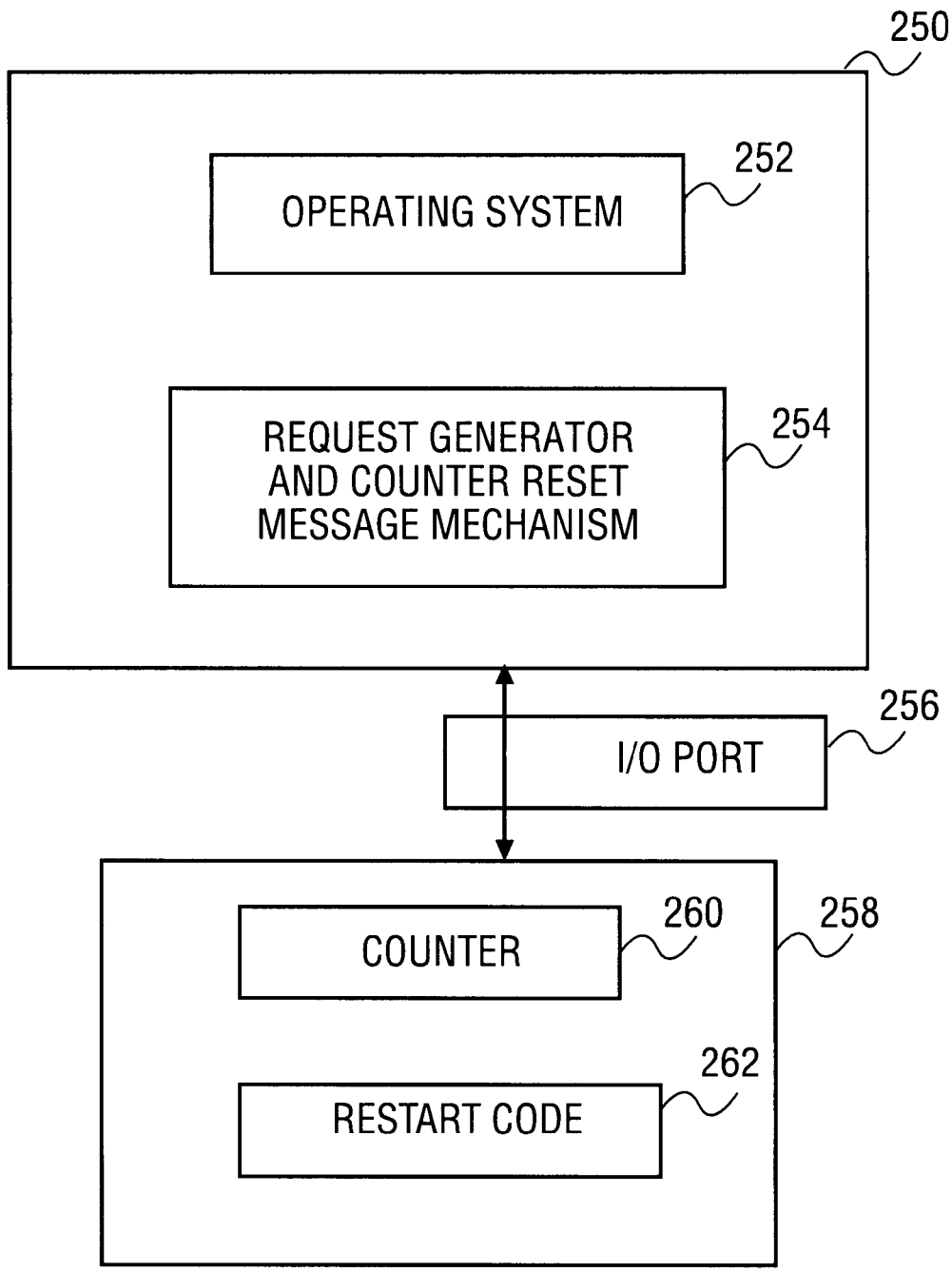
FIG. 4 shows an example of a computer readable media according to the present invention.

FIG. 4 shows an example of a computer readable medium in accordance with one example of the present invention.

This particular media includes two components, software component 250 and software component 258 which are stored in separate locations. In particular, software component 250 is stored in memory 16 and/or mass storage 18, and the software component 258 is stored in memory in the control device 24. Instructions and data is exchanged between these two components through the I/O port 256 which may be the same as the I/O interface 22 shown in FIG. 1. The software component 250 includes conventional operating system code 252. It also includes a request generator and counter reset message mechanism 254. The request generator generates the requests in step 202 and determines whether or not a response has been received. If no response has been received, the counter software 260 will continue to cause the counter maintained in the control device 24 to count. If a response has been received, then the software component 254 will cause a message to be sent through the I/O port 256 to cause the counter software 260 to reset the counter maintained in the control device 24. If the counter counts down to a predetermined value, then the restart code 262 will cause the actions which have been specified by the user, such as restarting the entire system, in the event of this failure.

Another example of a method of the invention will now be described. The operation of a digital processing system, such as the system of FIG. 1, is monitored, in effect, by a first software program which is executing on the digital processing system. The first software program monitors a second software program, such as a server application, which is also executing on the digital processing system. In this example, the second software program repeatedly sends a second status indicator to the first software program when the second software program is not in a fault state. If the second software program is in a fault state, the second status indicator is normally not sent to the first software program. The first software program maintains a counter which is reset when the second status indicator is received by the first software program. This counter, when it reaches a predetermined value (e.g. countdown to zero), indicates that the second software program is in a fault state because the second status indicator has not been received to reset the counter. When the first software program detects that the second software program is in a fault state, the first software program will cause a predetermined action to occur, such as quitting and restarting the second software program or restarting the computer. Normally, when the second software program is not in a fault state, the counter will not reach the predetermined value before a reset occurs. For example, the second software program may send a second status indicator (e.g. set counter of first software program to 5 minutes and start counting) once every minute or less and the counter will count for 5 minutes before reaching "zero." The second software program will, as long as it is not in a fault state, continue to send a second status indicator, each time resetting the counter to its initial value. If the second software program quits (e.g. a user causes it to quit), the program will send a status indicator which, in effect, stops the counter.

The first software program also sends a status indicator (referred to as a first status indicator) in this example to a control device, such as control device 24. This first status indicator, when received by the control device 24, resets a timer or counter maintained by the control device 24. This timer or counter is normally reset to a value several times as long as the expected time interval between consecutively received first status indicators. Normally, when the digital processing system is not in a fault state, the first software program will periodically (e.g. once every minute) send the first status indicator to the control device 24 so that the counter of this device does not reach a predetermined value (e.g. 0 minutes after counting down from 5 minutes). If, however, the first status indicator has not been received and the counter has reached the predetermined value (indicating a fault state), then the control device 24 performs a predetermined action/function, such as restarting the computer system (either by providing keyboard control signals such as "Control," "Alt," and "Del" on an IBM compatible PC or by turning the power to the system off and then on).

The foregoing description has assumed certain computer architectures for implementing the present invention. It will be appreciated that the timers may be in hardware or in software. It will be appreciated that in one implementation of the present invention, each timer may be implemented as a combination of hardware and software. A hardware timer can be hosted in an external device, such as device 24, or internally to the digital processing system.

The foregoing description has provided numerous examples of the present invention. It will be appreciated that various modifications and changes may be made without departing from the broader spirit and scope of the invention as set forth in the appended claims.

What is claimed is:

1. A method for controlling the operation of a digital processing system which is coupled to a control device which supplies power to said digital processing system, said method comprising:

receiving at said control device a first status indicator from a first software program which is executing on said digital processing system;

resetting a first counter coupled to said control device in response to receiving said first status indicator;

performing a first predetermined function in response to said first counter reaching a first predetermined value, wherein said first predetermined function comprises at least one of restarting said first software program or restarting said digital processing system, and wherein said control device restarts said digital processing system by providing a signal to said digital processing system;

receiving a second status indicator from a second software program which is executing on said digital processing system, said second status indicator being received by said first software program;

resetting a second counter maintained by said first software program in response to receiving said second status indicator;

performing a second predetermined function in response to said second counter reaching a second predetermined value.

2. A method as in claim 1 wherein said counter reaches said first predetermined value when said first counter is not reset after a predetermined period of time.

3. A method as in claim 2 wherein said second predetermined function comprises at least one of restarting said second software program or restarting said digital processing system.

4. A method as in claim 3 wherein said second predetermined function is user definable.

5. A method as in claim 4 wherein said first predetermined function and said second predetermined function are separately user definable.

* * * * *